Aug. 8, 1933.  F. G. RIDGERS  1,921,777
CABLE CLIP
Filed Oct. 7, 1932
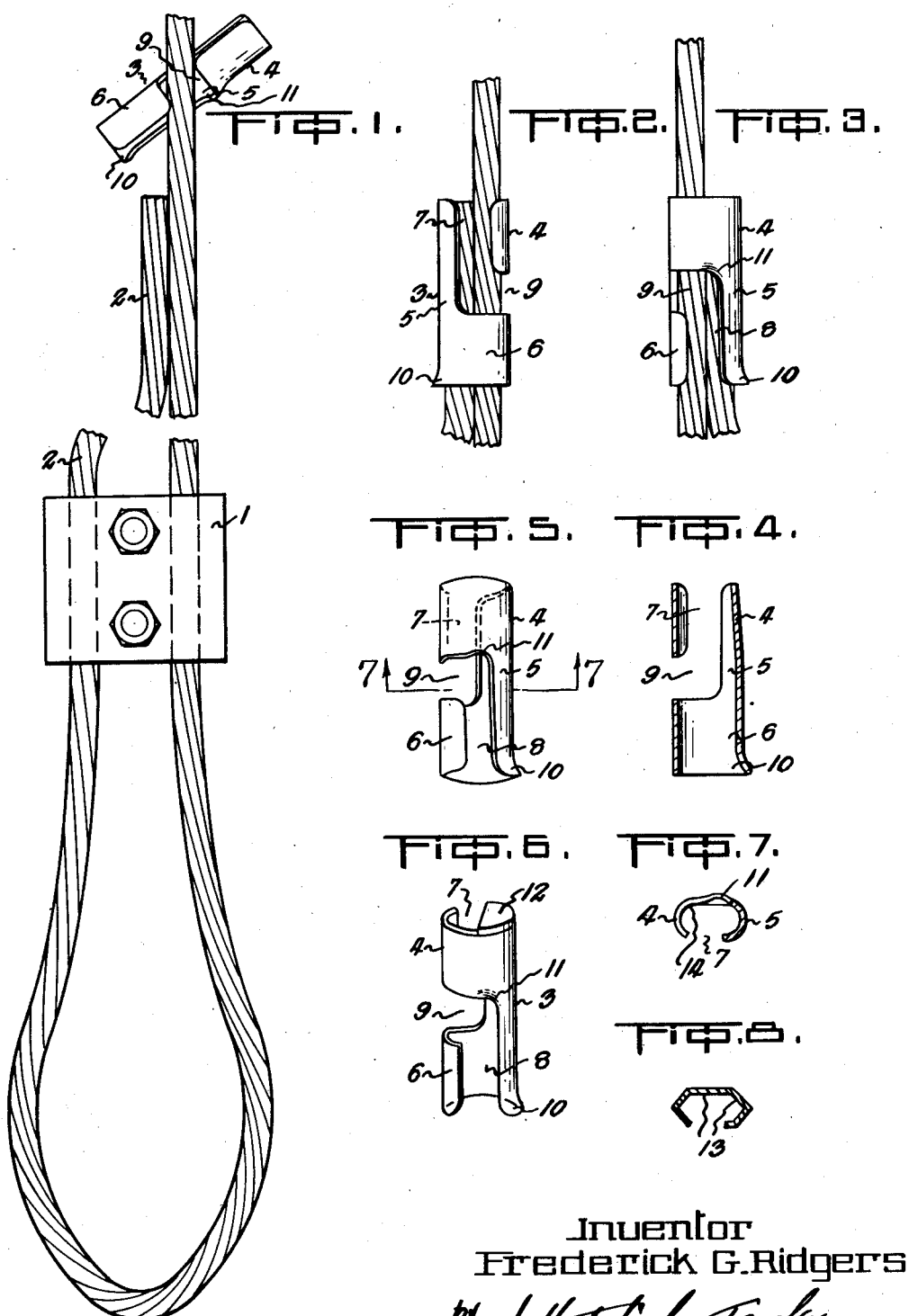
Inventor
Frederick G. Ridgers Patented Aug. 8, 1933

1,921,777

UNITED STATES PATENT OFFICE 1,921,777

CABLE CLIP

Frederick George Ridgers, Hamilton, Ontario, Canada, assignor to N. Slater Company Limited, Hamilton, Ontario, Canada, a Company of Canada Application October 7, 1932. Serial No. 636,759

13 Claims. (Cl. 24—115)

My invention relates to improvements in cable clips and is more particularly designed for engagement upon a cable end loop such as is formed at the lower end of a guy wire or cable where it is attached to a ground anchor or other securing means, although it is to be understood that my clip can be put to a diversity of uses apart from guy wires, for example it can be applied to any type of stranded cable where it is desired to retain the end from ravelling.

The object of my present invention is to furnish a preformed clip which will, in a cable loop, surround the free end of the cable and secure such free end against the body of the cable and, in carrying out my invention, I have so designed the clip that it can be positioned to surround the body of the cable and slid downwardly over the free end of the cable where it wedges or resiliently retains itself tightly in place.

A further object of my invention is to so construct my clip that it can be very readily positioned and secured in place and yet at the same time can not be readily removed by anyone tampering with the cable, and a still further object of my invention is to form my clip from an integral piece of material so that the cost of manufacture is reduced to a minimum.

My invention consists of a clip constructed and arranged all as hereinafter more particularly described and illustrated in the accompanying drawing in which:

Figure 1 is an elevational view of a cable end loop showing my clip initially positioned upon the cable.

Figure 2 is an elevational view of my clip positioned in place on the cable, such view showing one side of the clip.

Figure 3 is a similar view to Figure 2 showing the other side of the clip.

Figure 4 is a longitudinal cross sectional view through the clip.

Figure 5 is a perspective view of the clip.

Figure 6 is a perspective view of a modified form of the clip.

Figure 7 is a cross sectional view through the clip, being taken through the line 7—7, Figure 5, and Figure 8 is a horizontal cross sectional view through a slightly modified form of clip wherein the wire engaging sides thereof are made flat instead of rounded as shown in the other views.

Like characters of reference indicate corresponding parts in the different views in the drawing.

The loop as illustrated in Figure 1 is of the type generally formed upon the end of a guy wire or cable, and such loop is passed through the eye of an anchor rod or around some other suitable securing means. The turned up portion of the cable is secured to the body portion by any suitable type of clamp such as that indicated by the numeral 1. The free end 2 of the cable is allowed to project upwardly beyond the clamp 1 so as to furnish a means for gripping the cable if it is at any time desired to taughten the guy. When this is being done the clamp 1 is, of course, first loosened.

I has been found necessary to furnish some suitable type of clip or other securing means for retaining the end of the stranded cable from ravelling and also for securing such end to the body of the cable both for tidiness and also to shield such free end against being the possible cause of injury to persons or animals.

My clip comprises a sleeve which I broadly designate by the numeral 3 and such sleeve is formed of three integrally connected portions 4, 5 and 6, the sleeve, of course, being of substantially oval cross section to receive the two cables of the loop.

The sleeve end portions 4 and 6 are of substantially C shaped cross section and have their openings, or slots, 7 and 8 upon opposite sides of the sleeve. The central portion 5 is of U shaped cross section and forms an integral connection between the sleeve end portions 4 and 6. The slots 7 and 8 which extend inwardly from the ends of the sleeve are of substantially L shape and merge or are connected at their inner ends whereby they form a transverse slot 9 intermediately of the length of the sleeve. The transverse slot 9 extends around the sleeve from one side to the other and forms a cutaway central sleeve portion. It will thus be seen that the slots 7, 9, and 8 form what may be broadly termed a spiral slot running from end to end of the sleeve.

When the clip is being positioned in place it is turned substantially at right angles to the cable whereby the cable can be inserted into the transverse slot 9 as illustrated in Figure 1. The sleeve or clip is then swung into a position in alignment with the cable wherein the cable passes into the sleeve through the slots 7 and 8 and is freely slidable thereon. It is then slid downwardly until its lower end engages and surrounds the free end 2 of the cable loop. The clip is pushed or driven downwardly until a position is reached wherein the top of the end 2 is in the vicinity of the top of the clip.

In order to facilitate the entry of the cable end into the clip, particularly in cases where the strands of cable have become slightly ravelled, I form the end of the sleeve, which first engages the cable end 2, with a flare 10 and similarly flare the edge 11 of the portion 4 with which the cable end makes contact as the clip is moved therealong during insertion.

The sleeve 3 is preferably formed so that the portions 4 and 6 have a certain resiliency whereby they will tightly grip the double cable and furthermore I have found a certain advantage in forming the portion 4 in which the free end of the cable is contained of slightly taper form, as shown in Figure 4, so that a very tight grip is obtained as the cable approaches this end of the sleeve.

In the clip as illustrated in Figure 6, I furnish a closed end 12 against which the end of the looped wire may abut, such closed end positively preventing the clip from being forced into position such a distance as would permit the exposure of the cable end.

In Figure 8 I show the sleeve as formed with flat inner faces 13 instead of curved faces 14 as shown in Figure 7, as this form, while not departing in any way from the principle of my invention, has a certain advantage in that it reduces the area of friction when the clip is being forced into place. Upon desiring to remove the clip to gain access to the cable end 2 it is only necessary to hammer it upwardly away from the loop when it will disengage and can be temporarily taken off the cable, if so desired.

It will be seen from my description that I have designed a very simple and yet practical cable clip which can be removed and replaced any number of times as there is no necessity to bend or otherwise distort the clip for either attachment or removal and, although I have shown a particular embodiment of my invention, it is to be understood that I can make such changes and alterations as I may from time to time deem necessary without departing from the spirit of my invention as set forth in the appended claims.

What I claim as my invention is:

1. A cable clip adapted to engage the end and body of a cable end loop comprising an open ended preformed sleeve having a cable receiving slot extending from end to end thereof in a substantially spiral form.

2. A cable clip adapted to engage the end and body of a cable end loop comprising an open ended preformed resilient sleeve having a cable receiving slot extending from end to end thereof in a substantially spiral form.

3. In a cable clip adapted to extend around two lengths of cable, a sleeve comprising a pair of sleeve ends of C shaped cross section having their openings in opposite sides of the sleeve, and a central sleeve portion of U shaped cross section and formed integrally with the sleeve ends.

4. In a cable clip adapted to extend around two lengths of cable, a sleeve having an internal taper and comprising a pair of sleeve ends of C shaped cross section having their openings in opposite sides of the sleeve, and a central sleeve portion of U shaped cross section and formed integrally with the sleeve ends.

5. In a cable clip adapted to extend around two lengths of cable, a sleeve having an internal taper in the vicinity of one end and comprising a pair of sleeve ends of C shaped cross section having their openings in opposite sides of the sleeve, and a central sleeve portion of U shaped cross section and formed integrally with the sleeve ends.

6. In a cable clip adapted to extend around two lengths of cable, an open ended sleeve having a flare at one end and comprising a pair of sleeve ends of C shaped cross section having their openings in opposite sides of the sleeve, and a central sleeve portion of U shaped cross section and formed integrally with the sleeve ends.

7. In a cable clip adapted to extend around two lengths of cable, an open ended sleeve having a flare at one end and internal taper in the vicinity of the other end and comprising a pair of sleeve ends of C shaped cross section having their openings in opposite sides of the sleeve, and a central sleeve portion of U shaped cross section and formed integrally with the sleeve ends.

8. In a cable clip adapted to extend around two lengths of cable, a sleeve comprising a pair of sleeve ends of C shaped cross section having their openings in opposite sides of the sleeve, a central sleeve portion of U shaped cross section and formed integrally with the sleeve ends, a flared edge formed in one C end adjacent the central portion, and a flared edge formed in the other C end at the end of the sleeve.

9. In a cable clip adapted to extend around two lengths of cable, an open ended sleeve having a flare at one end and comprising a pair of resilient sleeve ends of C shaped cross section having their openings in opposite sides of the sleeve, and a central sleeve portion of U shaped cross section and formed integrally with the sleeve ends.

10. In a cable clip adapted to extend around two lengths of cable, a sleeve having an internal taper and comprising a pair of sleeve ends of C shaped cross section having their openings in opposite sides of the sleeve, a central sleeve portion of U shaped cross section and formed integrally with the sleeve ends, a flared edge formed in one C end adjacent the central portion, and a flared edge formed in the other C end at the end of the sleeve.

11. In a cable clip adapted to extend around two lengths of cable, a sleeve comprising a pair of resilient sleeve ends of C shaped cross section having their openings in opposite sides of the sleeve, a central sleeve portion of U shaped cross section and formed integrally with the sleeve ends, a flared edge formed in one C end adjacent the central portion, and a flared edge formed in the other C end at the end of the sleeve.

12. In a cable clip adapted to extend around two lengths of cable, a sleeve comprising a pair of sleeve ends of C shaped cross section having their openings in opposite sides of the sleeve and a connecting portion of the sleeve positioned between the two C portions.

13. In a cable clip adapted to extend around two lengths of cable, a sleeve comprising a pair of sleeve ends of C shaped cross section having their openings in opposite sides of the sleeve and a connecting portion of the sleeve positioned between the two C portions and formed integrally therewith.

FREDERICK GEORGE RIDGERS.